United States Patent [19]
Reinert

[11] 3,811,956
[45] May 21, 1974

[54] SEALANT FOR GALVANIC BATTERIES AND CELLS

[75] Inventor: Donald G. Reinert, Emmaus, Pa.

[73] Assignee: ESB Incorporated, Philadelphia, Pa.

[22] Filed: Nov. 2, 1972

[21] Appl. No.: 303,018

[52] U.S. Cl.................. 136/133, 136/170, 136/169
[51] Int. Cl. ............................................ H01m 1/02
[58] Field of Search .......... 136/170, 176, 166, 169, 136/133; 156/69; 264/41

[56] References Cited
UNITED STATES PATENTS
| | | | |
|---|---|---|---|
| 2,906,805 | 9/1959 | Zahn | 136/170 |
| 3,269,865 | 8/1966 | Swanson | 136/176 |
| 3,350,238 | 10/1967 | Wilson | 136/176 |

FOREIGN PATENTS OR APPLICATIONS
| | | | |
|---|---|---|---|
| 245,567 | 11/1960 | Australia | 136/170 |

*Primary Examiner*—Donald L. Walton

[57] ABSTRACT

A galvanic cell and battery sealant is described in which the sealant between container and cover has a permanent foam structure. The sealant may be any of the available sealant materials known to the art, having the properties of adherence, foamability, permanence and inertness to the battery electrolyte. The foamed sealant is equally suitable for batteries closed by sealant alone without a cover. Typical sealant materials are foamed epoxy, foamed phenolic, foamed furan and foamed polyester. The density of the foamed material may be chosen to be between 2 and 50 lbs. per cubic ft. A method for sealing galvanic batteries and cells also form a part of the invention. The foam sealant is readily removeable for battery repair.

8 Claims, 2 Drawing Figures

SEALANT FOR GALVANIC BATTERIES AND CELLS

BACKGROUND OF THE INVENTION

1. Field of the Invention

This invention relates to primary and secondary batteries and cells. In particular, it relates to means for sealing such devices.

2. Description of the Prior Art

Historically, asphalts have been used to seal the covers to the containers of nearly all forms of galvanic cells. The asphalts are essentially non-reactive to either acid, neutral or basic electrolyte solutions; they are inexpensive, can be melted and poured hot. They solidify to a more or less firm consistency when cool. They are sticky and adhere to practically all surfaces. They are used in lead acid batteries, air cell batteries, and in many forms of Leclanche dry cell batteries. However, in spite of this long list of desirable features, the asphalt sealants are not entirely satisfactory, particularly for long life secondary batteries exposed to vibration, very low or very high temperatures and other applications requiring a rugged long life device. Over the course of years, the volatile materials of the asphalt slowly evaporate and the residue may oxidize and become brittle. At arctic temperatures, asphalts also become brittle and often break whereas under tropic conditions the asphalts become semi-liquid and run out of the seal.

Many battery types having cases of hard rubber, polypropylene, polyethylene, etc. are now being sealed with resin sealants such as epoxy resins, and similar adherent polymerizable materials. Unfortunately, most of these materials are costly and relatively heavy. In the classical design of seal the cover of the battery is shaped to give a V-shaped trough with the side of the battery jar. An unavoidable narrow opening often is found at the bottom of the trough. Where asphalt is poured into such a trough, it is rapidly cooled by the cover and jar and bridges the narrow opening. Unfortunately, with the resin sealants the polymerization reaction is not sufficiently rapid to prevent some material from running through. This is wasteful of sealant and the run-down can interfere with the operation of the cell. Corrections for this such as placing a bit of rope or string at the bottom of the V are costly and time consuming.

These disadvantages have slowed the development of resin type sealants and have increased the cost of the batteries using resin type seals. Any means for reducing the cost of the resin type seals will result in lower costs to the consumer, i.e. the general public.

It has long been known that curable polymer materials can be formed into a cellular or foamed state by generating gas bubbles in the uncured mix. In one type of foam, each bubble of gas is enclosed in its own little shell and is separated from adjoining bubbles by a film of polymer. The resin may be flexible such as rubber or stiff as polystyrene. Such materials have been used wherever a light weight filling material is required. They have had especial use in packaging, floats, sound barriers, etc. More recently it has been realized that rigid foam materials are acceptable for structural application. As example, rigid foam materials are being used for furniture. Experimental houses have been built entirely from rigid foam.

SUMMARY OF THE INVENTION

The invention encompasses a galvanic battery having a seal of foam material, and foam material used as a battery sealant. Battery types for which the sealant is suitable include all forms of lead-acid cells and batteries, Leclanche dry cells and the many forms of alkaline electrolyte cells. The sealant is also suitable for gas electrode cells, fuel cells and hybrid cells. The method of sealing such cells as further described also forms a part of this invention.

Foam materials suitable for use as a battery sealant include foamed epoxy resins of all classes, foamed furans, foamed phenolics, and similar foamable materials.

It has been pointed out that batteries are being sealed at present with unfoamed resins. The use of these materials represents an advance in the art over the use of asphalt type materials. The change from unfoamed to foamed materials represents a reduction in the quantity of material used, thus a reduction in cost and weight. Other unexpected advantages have been found with the foamed materials. It has been found that the foamed seals are actually more durable than non-foamed seals. Because the foamed material is present in rather thin webs, it has somewhat more resilience than the solid materials. Thus, the foamed seal resists temperature changes better than solid seals particularly when the co-efficient of expansion for the seal material differs from that of the battery case and cover. Likewise, it is better under vibration. The foam is capable of dampening out vibration waves between the cell jar and cover. This reduces stress on the seal and also insulates and protects the internal components of the battery from vibrational damage. When ordinary polymerizable resin sealants are used to seal batteries, the resin, remaining liquid for some time after pouring, will run through any cracks, holes or any fissures between cover and jar. This results in waste of resin, an unsightly seal and in extreme cases incomplete sealing. As a cure, wicking is often pressed into the bottom of the sealing groove to temporarily seal possible cracks, etc. This is costly and time consuming. The foamed materials on the other hand although easily poured become stiff just as soon as the foaming starts. There is much less run down and the wicking is not needed.

The foaming type sealants are particularly desirable for a class of seal developed for unfoamed epoxy sealants where a groove is located in the battery cover and a tongue is formed on the lip of the container. When unfoamed epoxy sealant is used with this design of seal, the cover is placed upside down on a table and the uncured liquid epoxy is poured in to fill the groove about ½ way up. The battery assembly is then inverted and placed on the cover. The battery remains upside down on the table until the resin has set. Using the foamed resin with the same design of seal, it is noted first that much less resin is required. After pouring the resin in the inverted cover, the cover is turned right side up and then it is placed on the battery. The foaming of the resin causes the sealant to fill all the spaces between cover groove and container lip without running down the sides of the battery case. The batteries may be moved while the resin is still curing. Thus, with the foamed sealant it is not necessary to provide a curing area as is necessary with unfoamed resin type sealants.

It has been found that the density of foamed seals can be reduced considerably from that of the unfoamed resin. Thus, epoxies having a normal density of perhaps 75 lbs. per cubic foot can be used when foamed to a density of about 2 lbs. per cubic foot. The upper limit of density for foamed material is roughly 50 lbs. per cubic foot. A preferred range of densities is from 4 to 30 lbs. per cubic ft.

DESCRIPTION OF THE PREFERRED EMBODIMENT

Figure 1:
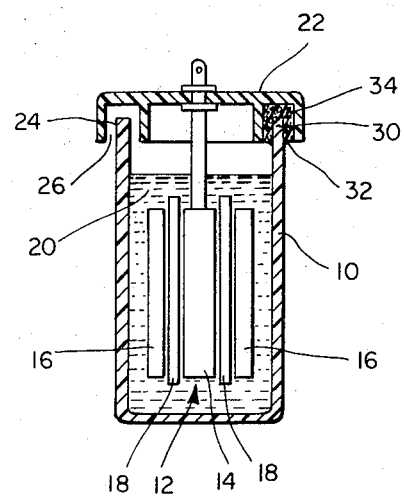
FIG. 1 shows in cross section a typical lead acid storage battery using the seal of the invention.

A battery sealant is prepared by mixing a liquid polymerizable uncured resin with a blowing agent and a curing agent. The resulting liquid mixture is used to partially fill the sealing groove of a battery. The curing reaction causes the blowing agent to produce gas which expands the sealant and causes it to form a permanent foam structure bonded to the walls of the sealing groove. In a second embodiment, a nulceating agent is added to the mix. There are several basic blowing agents in present use. A first is a dissolved gas. A gas is combined with the unpolymerized resin and curing agent by mixing gas and resin under high pressure. A typical gas is nitrogen. The mixture is then extruded from the pressure vessel to the atmosphere and the sealing space of a galvanic battery. The combined gas is liberated in minute bubbles and causes the resin to foam.

A second class of blowing agents are liquids. A volatile liquid such as water, alcohol, one of the freons, etc. is mixed with the resin and curing agent. Upon mixing, a chemical reaction immediately commences between the resin and the curing agent. This is the polymerizing reaction. It is normally exothermic liberating heat. The reaction is very slow at the start (at the time of mixing) but speeds up as the temperature rises. As the temperature of the mix containing the liquid approaches the boiling point the liquid vaporizes and causes the resin to foam.

A third class of blowing agents is a chemical readily decomposed by heat to produce gas. This is mixed with the resin and curing agent. The gas producing reaction proceeds as in the case of the liquid-resin mixture. Ammonium carbonate is one such chemical. The industry has developed numerous other blowing agents each having desirable properties.

It has been found in the foam part that a nucleating agent mixed with the other chemicals aids in giving a uniform foam and one having small rather than large individual pores. Such a foam is particularly desirable for the battery seals of the invention.

Foams produced in the manner described have discontinuous pore structure and thus are liquid tight. In the past, when using solid resins for battery sealants, there have been problems with the adherance of the resin to the battery container and cover materials. It is particularly important that the seal areas are clean. For best adherence, it may be desirable to treat the surfaces of the battery parts to be sealed. For example, with polyolefin containers a chromic acid etch or exposure to a flame improves the adherence of an epoxy sealant. When using the foamed materials, the same treatments are desirable. Quite unexpectedly, it has been found that the same resins when foamed produce a seal that is superior in adherance as compared to the same resin not foamed. We believe the explanation of this lies in the fact that the thin layer of sealant touching the wall of the battery container or cover is able to conform more exactly to the irregularities of the wall material during the polymerization reaction and thereafter than is the same resin in massive solid form. Although the foam materials may be rigid, they all have more flexibility when compared to the same material in solid form. This provides a superior seal where vibration may be encountered. The flexibility of the foam is also an advantage where the seal is exposed to temperature extremes such as is encountered in military battery service.

The use of a foam sealant for industrial battery seals has produced another quite unexpected benefit. The high relative cost of industrial storage batteries warrants their repair when minor internal malfunctions arise. When industrial batteries were sealed with asphalt, the opening of the cells was no great task as the asphalt is easily cut with a hot knife. However, cells sealed with solid resin such as epoxy resin are extremely difficult to open for repair. The sealant material must be chipped out with hammer and chisel. This is very time consuming and often results in damage to the cell jar and cover. However, when a foam sealant is used, it has been found that the opening operation is not much more difficult than with asphalt. The foam is quite readily cut with edged tools. Further, the cut surface provides excellent adherance upon re-sealing.

The physical characteristics needed for the resin are:

1. It must be liquid when uncured and a solid when cured.
2. It must be inert to the battery electrolyte.
3. It must adhere to the battery container and cover.

| Typical Resins Include: | Particularly Suitable For: |
| --- | --- |
| bisphenol liquid epoxy resins | all electrolytes |
| phenolic resins | acid electrolytes |
| furan resins | all electrolytes |
| polyester resins | acid electrolytes |

The curing agent, also known as a hardener or polymerizing agent, should likewise be liquid. For epoxy foams, it has been found that liquid amine type curing agents are well suited to the foamed sealant of this invention. In particular, the amine curing agents diluted in coal tar products are easily proportioned for mixing by usual battery manufacturing procedures. Other curing agents that can be recommended are: anhydride type curing agents and polyamid type curing agents.

Typical blowing agents include:
nitrogen gas
water
ammonium carbonate

Some nitrogen producing chemicals are:
nitrogen (N,N' dinitrosyl - N,N' dimethyl terpthalamide).
(N,N' dinitrose-pentamethylene tetramine).
(P,P' oxybix benezene sulfonyl hydrazide)

Liquid fluorinated hydrocarbons provide a broad range of boiling points. These can be blended to give a very complete range of boiling points.

Typical nucleating agents are:
 a. silica powder
 b. co-polymer of dimethyl poly siloxane and polyoxyalkylene ether. (A non ionic surfactant recommended for a foam regulator.)

The ingredients of the mix (except those using gas) may be mixed together in almost any order. However, it is more convenient to make the mix between resin and curing agent at the very last moment in order to get a reasonably long period between mixing and the curing of the resin.

EXAMPLES OF THE APPLICATION OF THE INVENTION

Example 1, a medium foam material for lead-acid battery seals.

|  | Parts by weight |
|---|---|
| Epoxy resin (epichlorohydrin-bisphenol A type) | 100 |
| Coal tar-amine hardener (alliphatic amine and inert coat tar products) | 100 |
| Chemical blowing agent (see above list) | 2.5 foam pre mix |
| Nucleating agent (see above) | 1.0 foam pre mix |
| Mixing directions: Mix resin, blowing agent and nucleating agent until completely dispersed, then mix in hardener until completely dispersed. | |
| Final density | 27.3 lbs./cu. ft. |

Example 2, a light foam material for lead-acid storage battery use.

|  | Parts by weight |
|---|---|
| Epoxy resin (same as Example 1) | 100 |
| Amine Hardener (same as Example 1) | 100 |
| Chemical blowing agent (same as Example 1) | 15 |
| Final density | 5 lb./cu. ft. |

Example 3, a very light sealant for Leclanche cell use:

|  | Parts by weight |
|---|---|
| Epoxy resin (same as above) | 100 |
| Chemical blowing agent (same as above) | 20 |
| Amine hardener (same as above) | 100 |
| Final density | 2 lb./cu. ft. |

In FIG. 1, 10 represents in cross section a storage battery container having a cell element 12 located thereon. The cell element comprises anode 14, cathode 16, separator 18, and electrolyte 20. A cell cover 22 closes the container. A lip 24 of container 10 is shown extending into the sealant space 26, found in the cover 22. A second lip 30 of container 10 is shown extending into the sealant space 32. In the seal of the example, a pre-mix is prepared as for instance in accordance with Examples 1, 2, or 4 above. To the pre-mix is added the hardener. A shallow layer of this pre-mix/hardener material is then poured into the sealant spaces 26-32 with the cell cover 22 inverted. The cover 22 is then righted and placed over the top of the storage battery container 10. After contact, the reactions between the pre-mix and hardener commence, the seal expands so as to fill the sealing spaces 26 and 32 and then hardens to produce the seal as shown at 34.

A lead-acid storage battery having a hard rubber container and cover was sealed in accordance with the above. A sample of the seal was removed and soaked in sulfuric acid (40%–150%F.) for 7 days. Weight gain = 0.7%. Another sample of the seal was pulled apart on a tensile machine. It was noted that the rubber of the jar portion fractured rather than the sealant.

Figure 2:
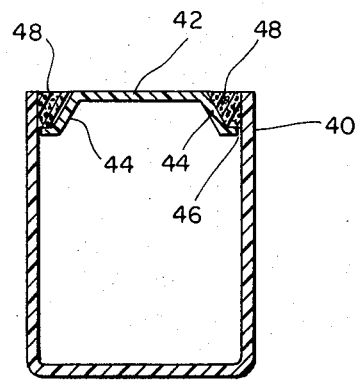
FIG. 2 shows in cross section another form of lead acid battery jar and cover using the seal of the invention.

FIG. 2 depicts a second form of seal for a lead-acid cell. This seal design has been used for many years with asphalt sealant. In FIG. 2, a jar 40 contains the storage battery element (not shown) and electrolyte (not shown). A cover 42 has a downwardly sloping lip 44, which at its lower point forms a fairly close fit 46 with the jar 40, but having a more or less triangular sealing space as shown. In FIG. 2, a small amount of foam sealing mixture has been placed in the sealing space where it has foamed up to fill the space, and has formed a seal with the cover and jar as shown at 48.

Other examples of the use of the seal of the invention in galvanic batteries will be apparent from this description.

Having described by invention and given examples of its use, I hereby claim:

1. In a galvanic battery comprising a container, a cover, a cell element located in the container the element having an anode, cathode, separator and electrolyte, a sealant space located between the container and the cover, a cured resin sealant located in the sealant space wherein the improvement is that the sealant comprises foam.

2. A galvanic battery as defined in claim 1 wherein the sealant is a liquid prior to curing and a solid when cured, the sealant is inert to the battery electrolyte and the sealant is adhered to the battery container and cover.

3. A galvanic battery defined in claim 2 wherein the sealant is foamed epoxy resin.

4. A galvanic battery as defined in claim 2 wherein the sealant is foamed furan resin.

5. A galvanic battery as defined in claim 2 wherein the density of the foamed sealant is between 2.0 and 50 lbs. per cubic ft.

6. A galvanic battery as defined in claim 2 wherein the density of the foamed sealant is between 4 and 30 lbs. per cubic ft.

7. A galvanic battery as defined in claim 2 wherein the sealant is foamed phenolic resin.

8. A galvanic battery as defined in claim 2 wherein the sealant is foamed polyester resin.

* * * * *